United States Patent
Taylor

(10) Patent No.: US 6,178,524 B1
(45) Date of Patent: Jan. 23, 2001

(54) INFORMATION PROCESSING SYSTEM HARDWARE TEST

(75) Inventor: James Leigh Taylor, Southampton (GB)

(73) Assignee: International Business Machines Corp., Armonk, NY (US)

(*) Notice: Under 35 U.S.C. 154(b), the term of this patent shall be extended for 0 days.

(21) Appl. No.: 09/070,832

(22) Filed: Apr. 30, 1998

(30) Foreign Application Priority Data

Sep. 30, 1997 (GB) .................................................. 9720621

(51) Int. Cl.$^7$ ...................................................... G06F 11/27
(52) U.S. Cl. ........................................................... 714/36
(58) Field of Search ........................... 714/36, 30; 713/1, 713/2; 717/4

(56) References Cited

U.S. PATENT DOCUMENTS

| | | | |
|---|---|---|---|
| 5,337,262 | * 8/1994 | Luthi et al. | 364/580 |
| 5,606,661 | * 2/1997 | Wear et al. | 395/183.14 |
| 5,675,748 | * 10/1997 | Ross | 395/284 |
| 5,805,796 | * 9/1998 | Finch et al. | 395/183.16 |
| 5,848,236 | * 12/1998 | Dearth et al. | 395/183.09 |

FOREIGN PATENT DOCUMENTS

WO 95/28047  10/1995  (WO).

* cited by examiner

Primary Examiner—Robert W. Beausoliel, Jr.
Assistant Examiner—Scott T. Baderman
(74) Attorney, Agent, or Firm—Douglas W. Cameron; Anne VAchon Dougherty

(57) ABSTRACT

An information processing system includes a plurality of different hardware component types (e.g. interface chip, chip port and chip port DMA channel hardware). The chip may include for example two chip ports, each of which includes twelve DMA channels. The system further includes software for controlling the operation of the hardware, the software providing a software class for each hardware type. Each software class defines a constructor for creating instances of each class, one instance for each member of the type e.g. twelve instances of the chip port DMA class. The constructor further includes or references test code for testing each type member. Thus, on construction of each instance of the chip port DMA class, the associated constructor tests the operation of the DMA channel. If there is a failure, the constructor throws an exception to the chip port constructor which then determines how to handle the error.

6 Claims, 2 Drawing Sheets

INFORMATION PROCESSING SYSTEM HARDWARE TEST

FIELD OF THE INVENTION

The present invention relates generally to the testing of information processing system hardware and more particularly, but not exclusively to Power-on Self Test (POST) of computer hardware.

BACKGROUND OF THE INVENTION

It is common practice during the initialisation of information processing systems such as computers, controller cards etc to carry out a series of tests on various components of the system hardware in order to determine that everything is in working order i.e. that an application designed to run on the hardware will function correctly. This type of testing is commonly referred to as Power-on Self Test (POST) and is carried out when the system is powered-on or otherwise reset. Traditionally POST code is provided in read-only memory in the system and runs as a completely separate program from the main application which subsequently runs on the same hardware. Typically, the POST code is designed to thoroughly test, in sequence, the operation of a number of critical hardware components. POST either terminates successfully or fails with some diagnostic code.

Coupling between the POST and the application is normally very poor in that failure of POST normally means that the application code never runs. This is because the application is assumed to be intolerant of bad hardware.

It would be desirable to provide a technique which is suitable for more closely coupling the POST and application and which allows for continued operation of the system in the event of non-critical failures detected during POST.

SUMMARY OF THE INVENTION

According to a first aspect of the invention, there is provided an information processing system including a plurality of hardware component types, each type including one or more members, the system further including software for controlling the operation of the hardware, the software being arranged such that each component type has associated therewith a software class which defines a constructor for creating one or more instances of the class, each instance corresponding to one member of the hardware type, the constructor for each software class further including or referencing program code for testing the operation of each hardware member of the associated hardware type.

Thus the present invention provides a system in which software classes are defined for each type of hardware component. Each class defines a constructor for creating one or more instances (objects) of the class, each instance corresponding to a member of the software type. The constructor further includes or references test code for testing the operation of the hardware member associated with the instance under construction. By providing local test code for a constructor, the associated hardware component can be tested more locally than is the case with the prior art POST operation where the test code for the various components is kept separate from the control code.

The present invention is applicable to systems incorporating different numbers of hardware component types. In one example, the system includes at least first and second hardware types, the second hardware type being a subcomponent of the first hardware type; the control software including first and second software classes associated with the first and second hardware types. In such a system, it is advantageous for the constructor defined for the first software class to be designed to call the constructor defined for the second software class to initiate construction of the one or more instances of the second software class corresponding to the one or more members of the second hardware type.

For example, as will be described below with reference to the preferred embodiments, the plurality of different hardware types may include a controller chip and a chip port. There may be one controller chip which includes two chip ports. A software class is defined for the chip and for the chip port. In operation, the chip constructor calls the chip port constructor which constructs two instances of the chip port class, one instance for each chip port present in the controller chip. Once the construction of each chip port instance is complete, the test code defined in the chip port constructor will test each chip port to determine whether it is operational. In accordance with one particular advantage of the present invention, if a failure is detected during the operation of the chip port, this error is reported back (e.g. in the form of an exception thrown by the chip port constructor) to the chip constructor. The chip constructor will then include the means for handling the error (catching the exception) e.g. by deciding whether the system can operate without the failed component.

In this way a component failure does not necessarily result in a failure of the complete system.

The present invention also provides a method of operating an information processing system having a plurality of hardware component types, each type including one or more members, the system further including software for controlling the operation of the hardware, the software being arranged such that each component type has associated therewith a software class which defines a constructor for creating one or more instances of the class, each instance corresponding to one member of the hardware type; the method comprising constructing the one or more class instances, and for each instance, executing program code for testing the operation of each hardware member of the associated hardware type, the test code being included in or referenced by the associated constructor.

A preferred embodiment of the present invention will now be described, by way of example only, with reference to the accompanying drawings.

DETAILED DESCRIPTION OF THE PREFERRED EMBODIMENT

Figure 1:
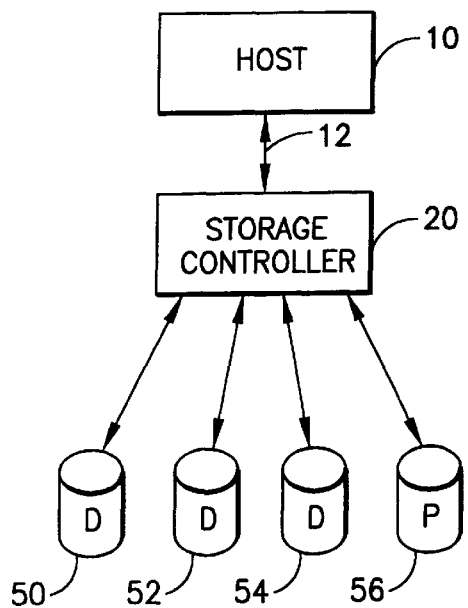
FIG. 1 is a block-diagrammatical representation of a data processing system including a storage controller.

The present invention is generally useful in improving the coupling between POST code and application (especially microcode or firmware) during system initialisation. However, by way of example, the embodiment of the present invention which will now be described relates to the initialisation of microcode/hardware of a storage controller card of the type shown in FIG. 1, wherein the controller 20 controls the transfer of data between a host system 10 and a number of disk storage devices 50, 52, 54, 56 (in RAID or JBOD configuration).

Figure 2:
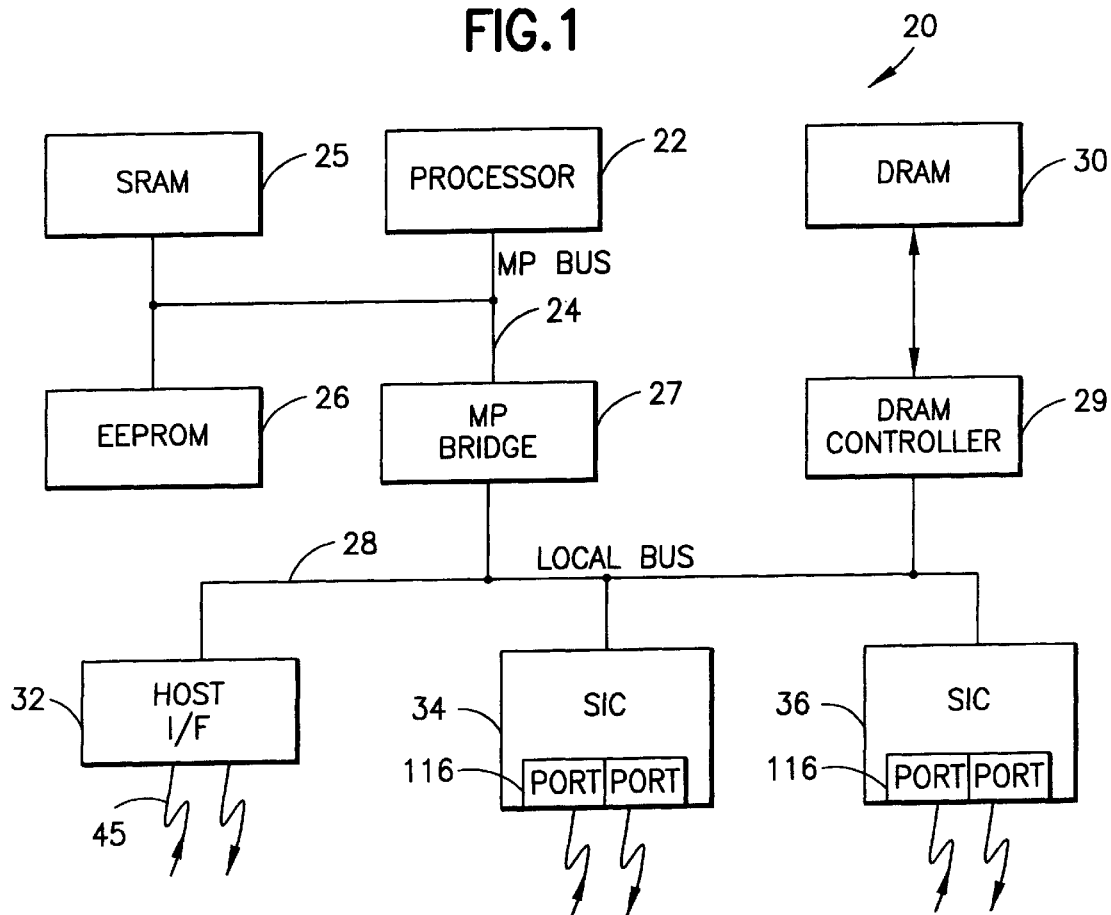
FIG. 2 is a block-diagrammatical representation of the major components of the storage array of FIG. 1.

The main components of the storage controller 20 are shown in FIG. 2. The controller includes a microprocessor 22 connected over a microprocessor bus 24 to SRAM 25 which contains microcode for controlling the various components of the array controller, and to EEPROM 26 in which is stored vital product data, card serial number etc. A microprocessor bridge 27 connects the microprocessor 22 over a local bus 28 to DRAM controller 29 which is in turn connected to DRAM 30. A host bridge 32 provides connection to the host system hardware through a PCI bus 45. Also connected on the local bus 28 are two serial interface chips (SIC) 34 and 36 each of which provide an interface to the attached disk drives in accordance with the Serial Storage Architecture (SSA) high performance interface. Each chip provides two ports 116, each providing twelve DMA channels for use in transferring data between the DRAM and the attached disk drives. Details of SSA are not important to an understanding of the present invention but may be obtained from the American National Standards Institute or numerous web pages e.g. http://www.ssaia.org.

As has been described, the control software for the storage controller is stored within the SRAM. In accordance with the present invention, the control software is written as object-oriented software in which the low-level classes mirror the functional blocks of the hardware. In the present embodiment, examples of such one-to-one correspondence between class and specific hardware include DMA channel, SSA Port and Serial Interface Chip.

Figure 3:
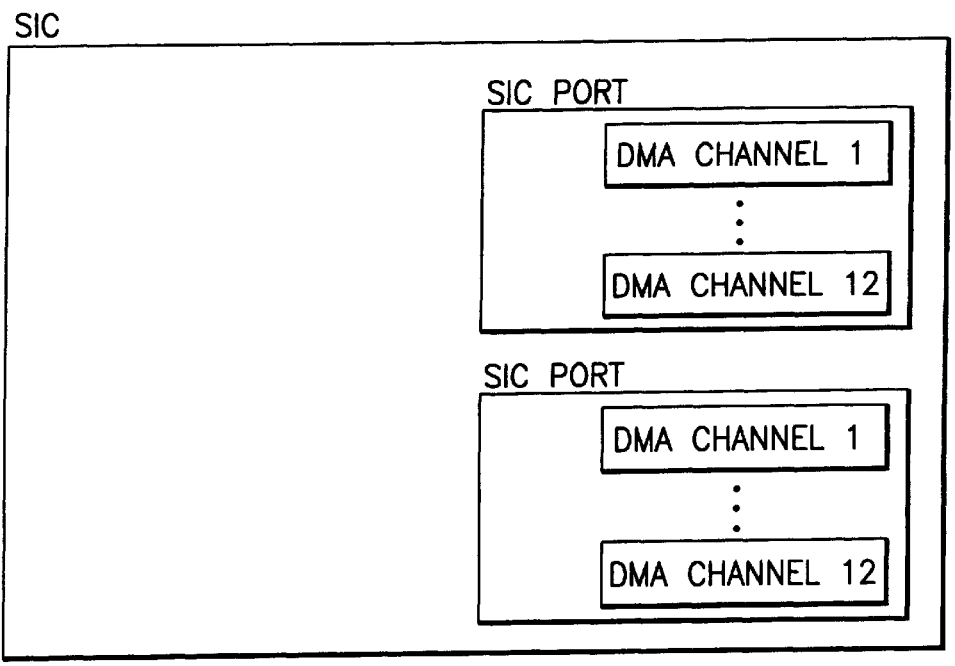
FIG. 3 represents the relationship of the various objects corresponding to components of the serial interface chip (SIC) of FIG. 2.

Furthermore, the relationships between the class instances (objects) closely resemble the relationships within the hardware. Hence, in the present embodiment, each SIC chip has two SSA Ports each of which has twelve DMA Channels. The hierarchical relationship between the corresponding objects is shown in FIG. 3 in which 12 DMA Channel objects (not all of which are shown) are 'nested' within each SIC PORT object and the two SIC PORT objects are nested within the SIC object.

It will be appreciated that this object hierarchy may in practice be extended by defining a class for the complete controller card with other classes being defined for other hardware components e.g. DRAM Controller, EEPROM. However in order to simplify the explanation of the present invention, the following description will focus on the relationship between the classes defined for three components, namely SIC chip, SIC PORT and SIC DMA Channel. Furthermore, the following description will be directed to an implementation in C++, although it will be recognised that the present invention can be implemented in other Object-Oriented Languages.

A general description of the embodiment will first be given with reference to FIGS. 3 and 4, followed by a more specific description with reference to example code as shown in Tables 1 to 5.

The instances (objects) of the SIC, SIC-PORT and SIC_DMA classes are constructed as part of the initialisation of the storage controller using constructors defined in each class. In general terms, constructors are methods for initialising an object at its definition time. When no longer required, an object is generally destroyed by a destructor. Details of constructors and destructors can be found in all good C++ reference manuals e.g. 'Annotated C++ Reference Manual' published by Addison Wesley ISBN 0-201-51459-1.

In the present embodiment however, the SIC, SIC_PORT and SIC_DMA objects persist throughout the operation of the controller i.e. they are not destroyed. Thus the constructor methods for these objects will run only at initialisation time and not at various times during the execution of the control software. This means that each constructor can be designed to be more complex as it will not impact the performance of the controller during operation.

As has been described with reference to FIG. 3, the SIC, SIC_PORT and SIC_DMA objects are arranged in a nested hierarchical structure. The construction of the objects is also carried out in a hierarchical fashion as represented in FIG. 4. The SIC constructor, the SIC_PORT constructor and the SIC_DMA constructor defined in the SIC, SIC_PORT and SIC_DMA classes respectively are represented as circles. As part of the initialisation of the controller, the SIC constructor calls the SIC_PORT constructor which in turn calls the SIC_DMA constructor. Thus the SIC_DMA objects are constructed as part of the construction of the SIC_PORT objects which are in turn constructed as part of the construction of the SIC objects.

In accordance with the present invention, this nesting of the class constructors is utilised to provide for local testing of each object as it is constructed. This is achieved by providing POST code in the constructor defined for each of the classes SIC, SIC_PORT and SIC_DMA. The constructor thus contains or references local POST code for testing the hardware to be controlled by the object being constructed. To take one example, the SIC_PORT class defines a constructor which includes POST code for testing the operation of the SIC Port hardware. If the local POST code is successful for a SIC Port, then the SIC_PORT object is constructed as normal and the software proceeds normally. If the local POST code fails, then there are two options depending on the severity of the failure. If the failure is severe i.e. the hardware is badly deficient, the SIC_PORT constructor fails. If the failure is partial i.e. the hardware is sufficiently functional to implement the full range of class methods defined in the object, the object may still be constructed with appropriate 'internal workarounds'.

In C++, a constructor cannot signal a test failure by returning a return code. However other mechanisms such as Exceptions are available whereby on detection of a failure, the constructor throws an exception. Details of exception handling in C++ may be found in Chapter 15 of the aforementioned C++ reference manual. The exception can advantageously contain diagnostic information about the problem.

Figure 4:
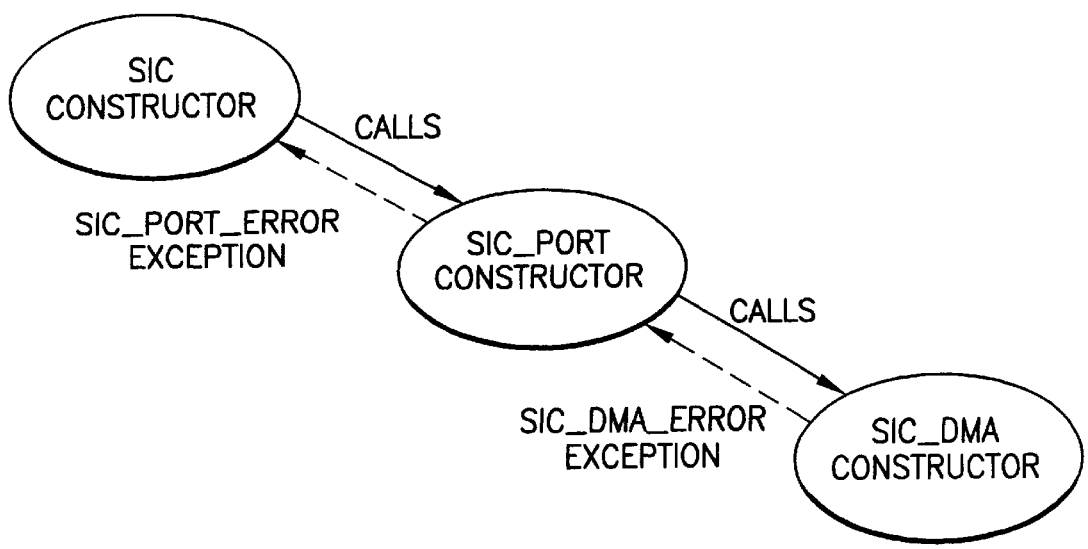
FIG. 4 shows the relationship between the constructors corresponding to the components of the Serial Interface Chip.

With further reference to FIG. 4, if for example, the SIC_PORT constructor detects a failure during testing of the SIC_PORT, it throws an exception. The exception will generally be caught by the SIC constructor which will include means for handling the error. Similarly, a failure during testing of a DMA channel will result in an exception being thrown which is generally caught by the SIC_PORT constructor. A DMA exception may alternatively (depending on the type of failure) propagate back through the call hierarchy where it is caught by the SIC constructor.

To take an example. As described above, a partial failure implies that the hardware is sufficiently functional to allow full implementation of the class interface i.e. that the microcode can run successfully on the hardware. An example of a partial failure would be an SSA Port within a SIC. The port has twelve DMA channels, not all of which are required to achieve full functionality. Assume that there is detected severe failure of the hardware for DMA channel six for example. This is detected when the SIC_DMA object controlling that hardware is constructed as part of the construction of the containing SIC_PORT object. Because the failure is severe, the SIC_DMA object constructor throws an exception. This is caught by the SIC_PORT constructor which then determines that the controller can, as a whole, proceed without channel six (e.g. by omitting dma channel six from the list of available channels). From this it can be seen that a severe failure of a piece of hardware (e.g. dma channel) is localised as a partial failure within a larger object (i.e. SIC PORT). Hence the functional impact of a hardware failure is contained.

Next will be described and shown in more detail the construction of SIC, SIC-PORT and SIC_DMA objects, with reference to example class definitions, constructors and test code in Tables 1 to 5. It will be appreciated that, in order to simplify the description, the code shown includes only those elements necessary to understand the invention. For example, each class definition will in practice include many more methods than just the Constructor. In the tables, ". . . " indicates some parameterisation or expression which may be required but which is not essential to an understanding of the present invention.

Table 1 includes definitions of Exception types associated with SIC, SIC_PORT and SIC_DMA. As shown SIC_PORT_ERROR and SIC_DMA_ERROR are specialisations of SIC_ERROR and SIC_PORT_ERROR respectively. In Table 1 are declared a number of hardware register types and also SIC, SIC_PORT and SIC_DMA classes.

Table 2 shows the class definitions for SIC, SIC_PORT and SIC_DMA. As has been described, these are stored in the controller SRAM. The SIC class includes a public declaration of the SIC constructor with associated parameter list and the fact that the SIC constructor can throw a SIC_ERROR. Defined with private access rights is the fact that the SIC has two SIC PORTS and hardware registers. In addition, a SIC test method is declared which is carried out at the end of the SIC construction.

The SIC_PORT class definition includes a declaration of the SIC_PORT constructor and the fact that the SIC_PORT constructor can throw a SIC_PORT_ERROR (as defined in Table 2). With private access rights, two data members are defined: 12 DMA channels per port and a number of SIC Port Registers. In addition, a SIC_PORT test method is declared which is carried out at the end of the SIC_PORT construction.

The SIC_DMA class definition includes a declaration of the SIC_DMA constructor and the fact that the SIC_DMA constructor can throw a SIC_DMA_ERROR (as defined in Table 2). A SIC_DMA test method is also declared which is carried out at the end of the construction of a SIC_DMA object.

Tables 3 to 5 define the methods associated with the classes SIC, SIC PORT and SIC_DMA respectively.

With reference first to Table 3, there is shown example code for the methods of class SIC. The SIC constructor has associated therewith a hardware address parameter (derived perhaps from a CONTROLLER constructor). The next statements construct two SIC port objects by allocating memory of the correct size and running the SIC_PORT constructor method. The SIC constructor also includes a catch statement for catching a SIC_PORT_ERROR thrown by the SIC_PORT constructor during the SIC_PORT test. If a SIC_PORT_ERROR exception is caught, the relevant port is marked as unavailable.

Once the SIC_PORT objects have been constructed, the SIC test code is executed. In this example, if one of the SIC_PORTS has failed then the SIC test also fails. A SIC_ERROR is thrown for catching by a constructor (e.g. Controller constructor) higher in the call hierarchy.

Table 4 shows the SIC_PORT constructor and SIC_PORT test code. As can be seen, the constructor calls the SIC_DMA constructor a total of twelve times to construct 12 DMA channel objects for each SIC_PORT object (see FIG. 3). For each SIC_DMA construction, the SIC_PORT constructor includes a statement for catching any SIC_DMA_ERROR exception that is thrown by the SIC_DMA constructor (not shown). For each exception caught, the associated DMA channel is marked as unavailable.

Once the SIC_DMA objects have been constructed (not necessarily all successfully), the test code for the SIC_PORT is run. In the example SIC_PORT test code shown in Table 4, the code tests for the number of good DMA channels. In this example, if the number is greater than or equal to nine, the test returns true to the SIC_PORT constructor. If the number of good DMA channels is less than nine, the test returns false. It can be seen in the SIC_PORT constructor code that in the event that the test result is false, a SIC_PORT_ERROR exception is thrown.

Thus in simple terms, the controller is designed to be operable with nine or more DMA channels per port. Only if less than this number are successfully tested does the port indicate an error condition to the SIC. The SIC may be able to contain this error or the exception may alternatively be caught higher up the hierarchy.

Table 5 shows an outline of a SIC_DMA constructor and SIC_DMA test code. The SIC_DMA constructor is first declared and the fact that it can throw a SIC_DMA_ERROR. Instances of further subcomponent classes (if any) can be constructed and the SIC_DMA is then tested as a system. If the test fails, the SIC_DMA constructor throws a SIC_DMA_ERROR exception for catching by the SIC_PORT constructor.

One advantage of the present invention is that because the POST code is integrated into the hardware controlling classes of the microcode, the contextual information is available to write very complex POST code using the methods of the objects which have already been constructed. Hence POST for a SIC Port within a SIC can use all the available methods to control the DMA channels to implement a POST function. This is in effect code reuse in that the microcode (e.g. for SIC DMA channels) is reused to implement the POST code (e.g. for the SIC Port).

As has been described the exception thrown by a constructor can include information concerning the type of error detected. This information can be very detailed, depending on the scope of the test carried out on a particular hardware component. Thus for example, the diagnostic information might state that DMA Channel 6 failed a read/write test. The user of the system thus has available detailed diagnostic information on the state of the system. Furthermore, the failure of one hardware component does not prevent the continuation of other tests, failure during which can be also reported to the user.

This availability of detailed diagnostic information can provide other advantages. For example, it is possible to mark particular objects or classes as Field Replaceable Units (FRUs). The diagnostic would then be arranged to follow certain rules to identify which FRU to replace. Thus the rules might define that an FRU should be replaced if it contains a failing component which is not itself an FRU or if it contains more than one failing component.

Although the invention has been described with reference to the initialisation and testing of microcode and hardware of a controller card, it will be appreciated that the invention is generally useful in information processing systems to provide closer coupling between hardware POST code and the application which runs on the tested hardware. The technique of the present invention is especially useful in information processing systems where the application is known e.g. control microcode where the microcode may be able to work around bad hardware provided sufficient diagnostic information is available.

It will be further appreciated that the present invention is not restricted to the use of the C++ programming language. Java (TM of Sun Microsystems) operates in a very similar way as C++ in that includes Constructor methods and exception handling. Implementation of the invention in other object-oriented languages will be apparent to the skilled man.

TABLE 1

Definition of Error Types

```
class SIC_ERROR { };                    // Define a SIC_ERROR type
class SIC_PORT_ERROR                    // Define a SIC_PORT_ERROR type
      : public SIC_ERROR                // which is a specialisation of SIC_ERROR
      { };
class SIC_DMA_ERROR                     // Define a SIC_DMA_ERROR type
      : public SIC_PORT_ERROR           // which is a specialisation of SIC_PORT_ERROR
      { };
```
Declare hardware register types

```
class SIC_Registers;
class SIC_PORT_Registers;
```
Declare types SIC, SIC_PORT and SIC_DMA

```
class SIC;
class SIC_PORT;
class SIC_DMA;
```

TABLE 2

Definition of class SIC

```
class SIC
      {public:
            SIC (. . . .) throw(SIC_ERROR);
      private:
            SIC_PORT * ports[2];              // The two ports in the SIC
            SIC_Registers * registers;        // Hardware registers for the SIC
            bool test ( );                    // SIC level test code
      };
```
Definition of class SIC_PORT

```
class SIC_PORT
      {public:
            SIC_PORT (. . . .) throw(SIC_PORT_ERROR);
      private:
            SIC_DMA * dmas [12];              // The 12 dma channels in the SIC
            SIC_PORT_Registers * registers;   // Hardware registers for the SIC_PORT
            bool test ( );                    // SIC_PORT level test code
      };
```
Definition of class SIC_DMA

```
class SIC_DMA
      {public:
            SIC_DMA (. . . .) throw(SIC_DMA_ERROR);
      private:
            bool test ( );                    // SIC_DMA level test code
      };
```

TABLE 3

Methods for class SIC

SIC constructor
SIC :: SIC (. . . .) throw(SIC_ERROR)

TABLE 3-continued

```
    {for (unsigned n=0; n<2; n++)         // for each port
      { try                                //   try to . . .
          (ports [n] = new SIC_PORT (. . . .);  //     . . . instantiate the port
        }
        catch(SIC_PORT_ERROR&)            // Port constructor threw an exception
          {ports [001b][n] = NULL;        //   so mark the port unavailable in list
          }
      }
      registers = . . . . ;                // Initialise registers with some value
      if (!test( ))                        // Test the SIC as a system
        throw SIC_ERROR (. . . .);         // If it didn't work, throw a SIC error
    }
SIC test
bool SIC :: test ( )                       // Method to test SIC as a system
    (for (unsigned n=0; n<2; n++)          // for each port
      if (ports [n] == NULL)               //   port MUST be available
        return FALSE;                      //   otherwise we fail
      return TRUE;                         // Otherwise return success (TRUE)
    }
```

20

TABLE 4

Methods for class SIC_PORT

```
SIC_PORT constructor
SIC_PORT :: SIC_PORT (. . . .) throw(SIC_PORT_ERROR)
    {for (unsigned n=0; n<12; n++)         // for each dma channel
      { try                                //   try to . . .
          {dmas [n] = new SIC_DMA (. . . .); //     . . . instantiate the dma channel
          }
        catch(SIC_DMA_ERROR&)              // DMA constructor threw an exception
          {dmas [n] = NULL;                //   so mark the dma unavailable in list
          }
      }
      registers = . . . . ;                // Initialise registers with some value
      if (!test( ))                        // Test the SIC_PORT as a system
        throw SIC_PORT_ERROR( );           // If it didn't work, throw a SIC_PORT
error
    }
SIC_PORT test
bool SIC_PORT :: test( )                   // Method to test SIC_PORT as a system
    {unsigned good_count = 0;              // Count the number of good dma channels
      for (unsigned n=0; n<12; n++)        // for each dma channel
        if (dmas [n] != NULL)              //   if dma channel is available
          good_count++;                    //     increment the good count
                                           // return TRUE if 9 or more dma channels
good
      return (good_count>=9) ? TRUE : FALSE;
    }
```

TABLE 5

Methods for class SIC_DMA

```
SIC_DMA constructor
SIC_DMA :: SIC_DMA (. . . .) throw(SIC_DMA_ERROR)
    {                                      // Construction of members can go here
                                           // Construction completed
      if (!test( ))                        // Test the SIC_DMA as a system
        throw SIC_DMA_ERROR( );            // If it didn't work, throw a SIC_DMA error
    }
SIC_DMA test
bool SIC_DMA :: test ( )                   // Method to test SIC_DMA as a system
    {                                      // Can put some tests here
                                           // which may fail (return FALSE)
      return TRUE;                         // Otherwise return true
    }
```

What is claimed is:

1. An information processing system comprising:

at least first and second hardware component types, the second component type being a subcomponent of the first hardware component type, each component type including one or more members;

control software for controlling the operation of the system, including a first software class associated with the first hardware component type and a second software class associated with the second hardware component type, each of the first and second software classes defining a constructor for respectively creating one or more instances of the first and second software class, each instance corresponding to one member of the associated hardware component type, the constructor for each software class further including or referencing program code for testing the operation of each of the one or more members of the associated hardware component type, the constructor defined for the first software class being designed to call the constructor defined for the second software class to initiate construction of the one or more instances of the second software class and wherein the constructor defined for the second software class includes means for flagging a test error occurring during the testing of a member of the second hardware component type to the constructor defined for the first software class.

2. A system as claimed in claim 1 wherein the test error is flagged as an exception thrown by the constructor defined for the second software class, for catching by the constructor defined for the first software class.

3. A system as claimed in claim 1 wherein the flagged test error includes information concerning the type of error encountered during testing of the member of the second hardware component type.

4. A system as claimed in claim 1 wherein the instances are created during initialisation of the system the program code referenced by or included in the constructor for each software class comprising POST code for testing operation of an associated hardware member.

5. An information processing system as claimed in claim 1 wherein the control software is microcode.

6. A method of operating an information processing system having at least first and second hardware component types, the second component type being a subcomponent of the first hardware component type, each type including one or more members, the system further including control software for controlling the operation of the system, including a first software class associated with the first hardware component type and a second software class associated with the second hardware component type, each of the first and second software classes defining a constructor for creating one or more instances of the class, each instance corresponding to one member of the hardware type; the method comprising:

constructing the one or more class instances; and for each instance, executing program code for testing the operation of each hardware member of the associated hardware type, the test code being included in or referenced by the associated constructors wherein the constructor defined for the first software class is designed to call the constructor defined for the second software class to initiate construction of the one or more instances of the second software class and wherein the constructor defined for the second software class includes means for flagging a test error occurring during the testing of a member of the second hardware component type to the constructor defined for the first software class.

* * * * *